United States Patent [19]
Lewandowski et al.

[11] Patent Number: 4,639,571
[45] Date of Patent: Jan. 27, 1987

[54] METHOD OF BEAM WELDING METALLIC PARTS TOGETHER AND APPARATUS FOR DOING SAME

[75] Inventors: Edward F. Lewandowski, Westmont, Ill.; Dale A. Cassidy, Valparaiso, Ind.; Robert G. Sommer, Lemont, Ill.

[73] Assignee: The United States of America as represented by the United States Department of Energy, Washington, D.C.

[21] Appl. No.: 802,874

[22] Filed: Nov. 29, 1985

[51] Int. Cl.$^4$ .............................................. B23K 15/00
[52] U.S. Cl. ....................... 219/121 EC; 219/121 ED
[58] Field of Search ................ 219/121 EC, 121 ED, 219/121 EZ, 161, 158, 121 LC, 121 LD

[56] References Cited

U.S. PATENT DOCUMENTS

| | | | |
|---|---|---|---|
| 2,987,610 | 6/1961 | Steigerwald | 219/121 ED |
| 3,016,449 | 1/1962 | Steigerwald | 219/121 EC |
| 3,458,683 | 7/1965 | Canonico et al. | 219/121 ED |
| 3,479,483 | 11/1969 | Boring et al. | 219/121 EC |
| 3,529,123 | 9/1970 | Hinrichs | 219/121 EC |
| 3,629,546 | 12/1971 | Fry | 219/121 FS |
| 3,881,084 | 4/1975 | Baardsen | 219/121 LD |
| 4,320,281 | 3/1982 | Crickshank et al. | 219/121 ED |
| 4,324,972 | 4/1982 | Furrer et al. | 219/121 FS |

Primary Examiner—C. L. Albritton
Attorney, Agent, or Firm—Hugh W. Glenn; Robert J. Fisher; Judson R. Hightower

[57] ABSTRACT

The disclosed method provides for temporarily clamping a metallic piece to one side of a metallic plate while leaving the opposite side of the plate exposed, and providing a heat conductive heat sink body configured to engage the adjacent portions of such one side of the plate and the piece at all regions proximate to but not at the interface between these components. Such exposed side of such plate is then subjected to an electron welding beam, in exact registry with but opposite to the piece. The electron welding beam is supplied with adequate energy for penetrating through the plate, across the interface, and into the piece, whereby the electron welding beam produces molten material from both the plate and the piece in the region of the interface. The molten material flows into any interstices that may exist in the interface, and upon cooling solidifies to provide a welded joint between the plate and piece, where the interface was, virtually without any interstices. The heat sink material prevents the molten material from extruding beyond what was the interface, to provide a clean welded joint. The heat sink body also mechanically holds the plate and piece together prior to the actual welding.

15 Claims, 5 Drawing Figures

FIG. 4
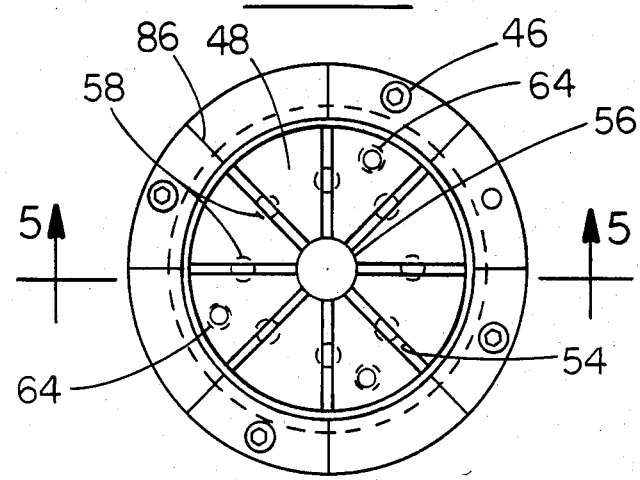
ELECTRON WELDING BEAM PATH
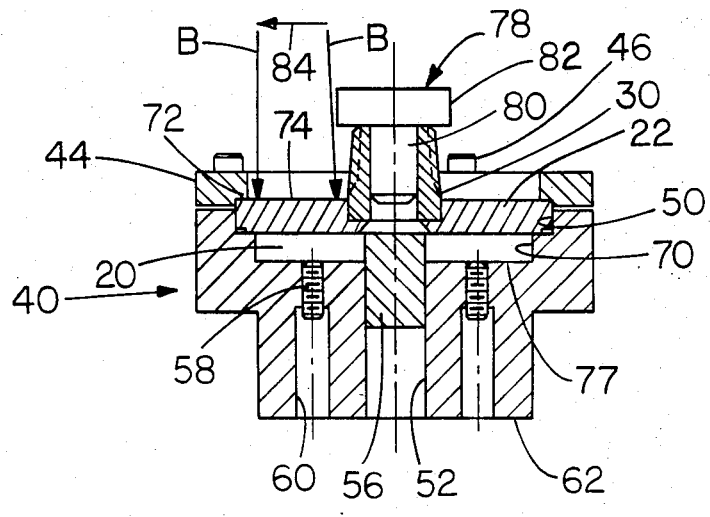
FIG. 5 and any such molten material substantially to the region of the interface, thereby to produce, upon the cooling and solidification of the molten material at the interface, a welded joint between the piece and plate along the interface with substantial elimination of the interstices, and with little if any flashing build-up beyond the welded joint.

METHOD OF BEAM WELDING METALLIC PARTS TOGETHER AND APPARATUS FOR DOING SAME

CONTRACTUAL ORIGIN OF THE INVENTION

The United States Government has rights in this invention pursuant to Contract No. W-31-109-ENG-38 between the United States Department of Energy and the University of Chicago representing Argonne National Laboratory.

FIELD OF THE INVENTION

This invention relates to electron beam welding, and particularly to beam welding two metallic pieces together at a weld joint on one side of one of the pieces, while directing the welding beam against the opposite or other side of the one piece, to cause the welding energy to penetrate through the one piece and weld the interface between the pieces; and to apparatus to practice this method.

BACKGROUND OF THE INVENTION

Frequently, a structural component may have two adjacent shapes quite different from one another, even though the different shapes are formed on the same component. Thus, a supporting plate may have a vane upstanding at a sharp angle from the plate, and the supporting plate and vane may be cast or molded together as a common structural component. Alternatively, a solid piece may be machined to remove some of the material to provide the two distinct plate and vane shapes when finished; so that the plate and vane start and remain unitary with one another.

Casting or molding of such component shapes may not be possible for any of several reasons. For example, the material from which the piece is to be formed may not be readily fabricated by casting, such as stainless steel. The surface finish of the finished piece may be too rough, or porous, for the intended end use of the piece. Thus, a pump intended to be operated with a strong solvent or contaminating fluid, may require fabrication of a highly resistant, nonporous, smooth material, such as stainless steel, for durability of service, for enhanced flow, and for reduced build-up of the fluid in surface interstices.

Fabrication by machining from a solid piece of material, stainless steel for example, may be extremely expensive, and thus undesirable if not highly impractical.

Adjacent metallic pieces, even of stainless steel, can typically be mechanically secured together across a welded joint, by using any of many sources of heat sufficent to melt the interface between the pieces, where the welded joint may then be formed upon the cooling and solidification of the molten metals across the interface.

A heli-arc welding technique can be used effectively to weld adjacent pieces of stainless steel together. However, the technique is difficult to use without leaving some "flashing" build-up of excess weld material at the interface between the adjacent pieces. Consequently, heli-arc welding of a thin vane to a plate will generally turn out with a flashing bead along the vane, at the juncture between the faces of the vane and plate. This may require extra machining to remove the bead, or its presence can reduce the flow of the fluid along the vane.

An electron beam, or a beam of charged particles, in a protective atmosphere or a vacuum, may be used for welding. The beam is focused at and against the interface region of the adjacent butted pieces to excite the molecular structure of the adjacent pieces at the interface. With a sufficiently powerful beam, the beam may heat the metal pieces enough to cause them to melt at the interface, which thereupon can produce a fused or welded joint between the pieces, upon the cooling and solidification of the molten material at the interface.

While the beam can be focused quite accurately at and against the particular interface region to be welded, some heat transfer, by conduction through the metal pieces, may occur to spread the molten pool beyond the intended interface. This may leave a flashing build-up of solidified weld material beyond the intended welded joint.

It is possible also to weld two adjacent pieces of metal together, across a welded joint defined solely on one side of one of the pieces, by directing the electron welding beam against the opposite side of the one piece. The energy of the beam may be caused then to penetrate through the one piece, sufficient to heat the interface, including the adjacent other piece butted against the opposite side of the one piece, to melt both pieces sufficiently at the interface and thereby provide for a welded joint upon the cooling and solidification of the molten interface material.

The problem of flashing build-up generally is quite pronounced with this type of beam welding, where excess heating and pooling of the molten material at the interface may be common. On the other hand, deliberate efforts to minimize excess heating may provide inadequate heating, to leave interface regions where insufficent melting of the adjacent pieces may produce a poor or spotty weld.

SUMMARY OF THE INVENTION

It is a general object of the present invention to provide a new and improved method of beam welding two metallic pieces together, the pieces initially being butted across an interface, to yield a welded joint that is virtually confined to the region of the interface, with little if any exposed flashing build-up beyond the welded joint, and that is continuous with few if any interstices remaining between the pieces across the welded joint.

Another general object of the present invention is to provide improved apparatus for practicing the beam welding method noted above.

To achieve these and other objects, the present invention provides a method of welding one metallic piece to one side of a metallic plate from the opposite other side of such plate. Such method comprises temporarily clamping the one piece to such one side of the plate while leaving the opposite side of the plate exposed. The clamped piece and plate initially have an interface therebetween with interstices. A heat conductive heat sink material is configured to engage such piece, and such plate on the one side, each at locations proximate to but spaced from the interface. The other side of such plate is subjected to an electron welding beam, focused narrowly at and in registry opposite to the clamped piece. The electron welding beam is supplied with adequate energy for penetrating through the plate, across the interface, and into the piece. The electron welding beam produces molten material from the plate and piece at the interface. The heat sink material sufficiently cools the plate and piece proximate to but not at the interface, preventing thereby the molten material from extruding from the interface. Instead, the molten material fills the interstices to provide such welded joint as being substantially void of interstices.

The piece may be elongated, as a vane, to meet the plate along an interface tracing a path along the plate. The beam may thus be moved along the path, in opposite registry to the elongated piece, to provide a continuous welded joint along the interface.

Several metallic pieces may be welded to one side of a metallic plate from the opposite other side of such plate, by temporarily clamping each of the pieces to such one side of the plate while leaving the opposite side of the plate exposed. The welding beam may be directed against the other side of such plate then, successively being focused in registry opposite to each of the clamped pieces.

An electrically conductive heat resistant shield, of tungsten or equilivent material, may be located on the other side of such plate between the source of the beam and the plate, operable to interfere with the direct bombardment of, and thus reduce the heating effect of, the electron welding beam on certain protected regions of such plate.

The method may be limited to a plate having a thickness less than of the order of 0.5-0.7 of an inch (12-18 millimeters).

The clearance tolerances between the heat sink and the engaged portions of the plate and piece are close, of the order of only several thousandths of an inch, perhaps between 0.002-0.010 of an inch (0.05-0.25 of a millimeter).

The method may be used to weld together a plate and a piece each formed of 304 stainless steel.

The apparatus for welding the metallic piece to the one side of the metallic plate, by directing the electron welding beam against the opposite side of the plate, may be in the form of a heat sink body made of a heat conductive material, such body having a surface for engaging such one side of the plate, and also having a recess or slot therein, from the surface, for receiving and contacting the piece. First clamping means are provided for clamping the plate against the heat sink body, with such one side of the plate engaging such surface of the heat sink body. Second clamping means are connected with the heat sink body for clamping the piece against the one side of the plate, across an interface therebetween. The first clamping means affords an opening exposing much of the other side of the plate, so that such other side can be directly subjected to the electron welding beam in opposite registry with the underlying clamped piece. The electron welding beam is focused for penetrating through the plate and into the piece to produce molten material from each at the interface, which upon cooling solidifies and forms a welded joint thereat. The heat sink body affords a heat sink for cooling the plate and piece proximate to but not at the interface, and prevents thereby the molten material from extruding beyond the interface.

The apparatus provides close clearance tolerances between such body recess and the piece received therein, of the order of only several thousandths of an inch, between 0.002-0.010 of an inch (0.05-0.25 of an millimeter).

In a preferred embodiment, the heat sink body recess is elongated in the form of a slot, and the piece is elongated to fit within the slot. Moreover, the elongated piece, while still in the recess, is thus clamped against the one side of the plate, across a correspondingly elongated interface therebetween.

Set screws threaded into taps in the heat sink body may be driven against the piece, as received in the slot, for clamping the piece against the one side of the plate, across the interface therebetween.

A clamping member may overlie the other side of the plate, and bolts may be threaded into taps in the heat sink body to draw the member tightly against the other side of the plate for clamping such one side of the plate to engage such surface of the heat sink body.

The heat sink body may be formed of copper to provide good thermal conductivity.

A shield may be provided, as well as means to support the shield to be interposed between the source of the electron beam and a portion of the one side of the plate. Such shield is made of an electrically conductive material having good thermal resistance, and operates to prevent direct bombardment of the beam against such portion of the one side of the plate.

The disclosed apparatus may be used for welding a plurality of thin elongated metallic pieces, such as vanes, to one side of a metallic generally planar plate having a transverse edge, by directing the electron welding beam against the opposite side of the plate. Such apparatus may comprise a heat sink body made of a heat conductive material, such body having a cup shape, including a generally planar surface and an annular rim upstanding from the surface and configured to correspond with the transverse edge of the plate. Such body may also have a through opening inwardly spaced from the rim, a plug adapted to be temporarily press-fitted in the through bore, and a plurality of slots in the surface, corresponding in number to the number of pieces, the slots extending radially from the opening. The pieces are adapted to be received in the slots, one in each slot, with the tolerance clearance between the pieces and the slots being close to provide a sliding fit. Means are provided for clamping the plate against the body, with such one side of the plate engaging such surface of the heat sink body. A plurality of set screws may be threaded in taps in the heat sink body, one of each opening to one of the respective slots generally mid-way between the rim and the opening of the plate, each set screw being operable to be driven against a respective one piece in the slot, for clamping each piece against the one side of the plate, across an elongated interface therebetween. The first clamping means affords exposure of the other side of the plate opposite to each of the underlying clamped pieces. Thus, the other plate side can be directly subjected to the electron welding beam, focused in opposite registry successively, with each of the underlying clamped pieces. The electron welding beam will be of intensity sufficient for penetrating through the plate and into each of the pieces to produce molten material from each at the respective interface, which upon cooling solidifies and forms a welded joint thereat. The heat sink body affords a heat sink for cooling the plate and each of the pieces proximate to but not at each of the respective interfaces, and prevents thereby the molten material from extruding beyond the interfaces.

BRIEF DESCRIPTION OF THE DRAWINGS

Further objects, advantages and features of the present invention will appear from the following description, taken with the accompanying drawings, in which:

FIG. 4 is a top plan view of the component assembly and apparatus of FIG. 3, shown in operative association with one another.

FIG. 5 is an elevation sectional view, as seen generally from line 5—5 in FIG. 4.

DETAILED DESCRIPTION OF AN ILLUSTRATED EMBODIMENT

Figure 2:
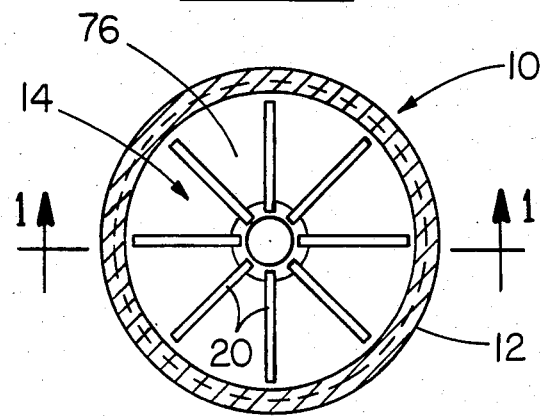
FIG. 2 is a plan type sectional view, as seen generally from line 2—2 in FIG. 1.
Figure 1:
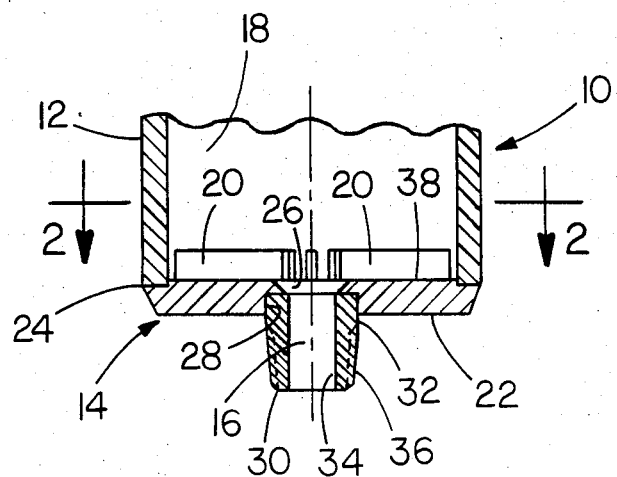
FIG. 1 is an elevational type sectional view, as seen generally from line 1—1 in FIG. 2, showing a container having a component assembly thereof fabricated of several separate pieces formed in part in accordance with the method of and apparatus for beam welding to be disclosed herein.

FIGS. 1 and 2 illustrate a liquid-tight container 10 formed with cylindrical side wall 12 and bottom wall assembly 14. A passageway 16 through the bottom wall assembly 14 communicates container interior 18 with the exterior. Radial vanes 20 upstand from the inner side of the bottom wall assembly 14.

The bottom wall assembly 14 may include a generally planar circular plate or disc 22 having an edge which may be secured, across liquid-tight joint 24, to the upstanding cylindrical wall 12. The passageway 16 may be defined by openings 26 and 28 in the plate 22 concentrically of the cylindrical container wall 12, and by a fitting 30 received in the opening 28 and secured to the plate across liquid-tight joint 32. Fitting bore 34 lines up with the plate opening 26 to define the passageway 16; and conventional threads 36 may be formed on the fitting 30 to provide means to secure a mating fitting (not shown) thereto. Each vane may be connected to the plate 22 across the region or joint at 38.

The container 10 might be used as part of a centrifugal liquid separator, where two liquids may be admitted into the container at spaced inlet passageways (neither being shown) near the upper end of the container, may then be mutually exposed to the one another within the container, and may then be discharged as two somewhat different liquids from two separate outlet passageways, one passageway being shown as 16 from the bottom wall assembly 14 and the other passageway (not shown) being from the cylindrical wall 12 near its upper end. A rotor (not shown) may fit within the container, and upon being rotated, cause the desired liquid exposure and mixing.

One specific type of liquid separator might deal with radioactive materials, utilizing a solvent-solvent extraction process. Under such circumstances, very precise configurations and modes of construction must be used. For example, the components must be fabricated with few if any interstices, such as in the joints 38 between the plate and vane components, to minimize collection therewithin of any radioactive particles carried in the liquids passing through the container 10. Also, the components including the vanes 20 should be precisely located and oriented, such as radially from the outlet passageway 16 and angled at right angles, relative to the bottom wall plate 22. Moreover, the exterior surfaces of the vanes should be smooth and nonporous, and the juncture between each vane and the plate should be free of bead or equivalent build-up, to allow resistant-free flow of the liquid from the container 10 along the vanes to the outlet passageway 16.

As was noted above, prior to this invention, the need for these factors required consideration of a one-piece machined bottom wall assembly 14, with the plate 22, outlet passageway 16, and vanes 20 being unitary and formed from a single block of suitable material, generally 304 stainless steel, with the excess material being machined away to define the proposed configuration.

The bottom wall assembly 14 may advantageously be formed of separate plate and vane components, secured together across the regions or joints 38 according to the improved method and apparatus to be disclosed herein.

The bottom wall assembly of plate 22 and vanes 20 may advantageously be secured together across the regions or joints 38 according to the improved method and apparatus to be disclosed herein.

A fixture 40 (see FIGS. 3, 4 and 5) is provided, having a generally cup-shaped block 42 and a clamping ring 44 adapted to be held to the block 42 by bolts 46 threaded into taps in the block. The block has a flat face 48 surrounded by an upstanding annular rim 50, a central bore 52 extended through the block from the face 48, and radial recesses or slots 54 in the block face 48 extended outwardly from the bore 52. A plug 56 is press fit or otherwise secured in the through bore 52, with its flat free end terminating generally coplanar with the block face 48.

Set screws 58 are threaded into taps in the block 42, each tap opening at one end to one of the radial slots 54 approximately at the mid point between the through bore 52 (or plug 56) and rim 50. The other end of each threaded tap opens to a slightly larger bore 60 in the block 42, which opens to the outer block face 62. An appropriate tool (not shown) can be fitted into each bore 60 to drive the set screw 58 into the slot 54. Three knock-out screws 64 are also shown (see FIG. 4) threaded in taps formed in the block 42, each of the taps opening at its opposite ends, respectively to the block faces 48 and 62; and at a location on the block face 48 spaced from the radial slots 54.

A pin 66 (see FIG. 3) is provided on the block 42 adapted to cooperate with an opening 68 in the clamping ring 44, to allow the clamping ring to be connected to the block in only a single orientation.

The separate vanes 20 are illustrated as being elongated thin members, generally of rectangular shape; and each of the block slots 54 is sized to receive on respective vane member. The tolerance of the vane member and block slot is close, with each vane member just fitting in the slot with a reasonably tight sliding fit, including at its opposite ends relative to the plug 56 and to block surface 70. However, the depth of the slot may be slightly larger than but not less than the height of the vane member, so that the vane member can fit in the slot and not project beyond the block face 48.

The annular rim 50 is sized to allow the plate 22 to be fitted against the block face 48, with the circular edge of the plate in a close tolerance sliding fit with the annular rim. In this association, the plate openings 26 and 28 are concentrically aligned with the plug 56. The clamping ring 44 has a lateral shoulder 72 to overlie the upper surface 74 of the plate 22, to allow the ring, when the bolts 46 are drawn snug against the ring, to firmly hold the adjacent lower surface 76 (see FIG. 2) of the plate 22 against the block face 48. In this relationship, the fitting 30 is projected upwardly from the plate 22, fitted within the plate opening 28 and being secured to the plate by the already welded joint 32.

Each set screw 58 can be tightened against the free edge 77 of one of the vane members 20 fitted in the respective block slot 54, to force the the opposite vane edge against the adjacent surface 76 of the plate 22.

A shield 78 is also provided, having a stem 80 to fit with free-sliding clearance into the fitting bore 34, and having a cap 82 overlying all of the end of the fitting 30 and even projecting laterally somewhat beyond the exterior side of the fitting, as beyond threads 36. The shield cap 82, at least, is formed of a durable heat resistant electrically conductive material, such as tungsten. The shield precludes the direct bombardment of the electron welding beam against the fitting 30 and inward portions of the plate, and the resultant unwanted heating of them. Annularly of the shield, out to the clamping ring 44, the surface 74 of the plate 22 is exposed.

The fixture block 42 and clamping ring 44 thus serve to hold the vane members 20 tightly against the plate 22, and at the proper location and orientaion. Moreover, these fixture components 42 and 44 are formed of a good thermally conductive material, such as copper or an alloy of copper, to provide a good heat sink for the vane members and plate. The close fit of the vane members 20 within the fixture slots 54, and of the plate 22 against the block face 48, provides effective heat dissipation from those components to the fixture, in the region close to, but not at the actual interface where the vane members 20 are clamped against the plate 22.

Having described the fixture 40, it will be appreciated that the vane members 20 are positioned in the fixture slots 54, the plate 22 is positioned in block face 48, and the clamping ring 44 is secured in place over the plate. The vane members are thus temporarily clamped with their corresponding edges against plate surface 76, by moving the set screws 58 against the opposite corresponding edges 77. The plate and vane members, even as mechanically clamped together, initially yet have voids or interstices across the interface therebetween. The shield 78 is positioned in place over the fitting 30, leaving the opposite surface 74 of the plate 22 yet exposed radially of the shield out to the clamping ring 44.

To practice the invention, an appropriate conventional electron beam welding machine will be provided, but is not illustrated. The welding machine may be of any suited design, but will generally have means for supporting the fixture 40 and components 20 and 22 clamped therein; means for providing a protective atmosphere, or vacuum, around the fixture and clamped components; means for generating an electron beam and for focusing the beam against the components; and means for moving the fixture and/or beam relative to one another to allow the beam to be directed against and/or moved along specific areas of the components. In practice, the focused electron welding beam may be of a very small circular or near circular cross section, of perhaps less than even 0.05 of an inch (1 millimeter) across.

With the fixture 40, and the vane and plate components 22 and 20 respectively clamped thereto, located in the electron beam machine, the electron welding beam B (see FIG. 5) is directed against the surface or side 74 of the plate 22, focused narrowly at and opposite from one of the clamped vane members 20. With the beam B focused to hit the plate surface 74 opposite from the individual vane member clamped against the opposite side or surface 76, the beam and/or fixture may then be moved to cause the focused beam to move, or track, along the length of that vane member. As FIG. 5 depicts with the lines B and the direction of arrow 84, the beam preferably is initially focused against the inner end of the individual vane member, and is then moved outwardly along the vane member to just short of the clamping ring 44. At this time, the beam can be deenergized, or refocused off of the plate 22, and returned to the inner end of another vane member for welding the same. The separate vanes are thus individually and sequentially welded.

Indexing marks 86 may be made on the exposed face of the clamping ring 44, lined up with the slots 56, to allow the accurate indexing of the fixture 40 relative to the beam B, and for tracking the beam along the side 74 of the plate 22 in exact registry with, but opposite to, the underlying vane members.

The electron welding beam is supplied with adequate energy for penetrating through the plate, across the clamped together interface, and into the respective vane member. This electron welding beam thereby heats the vane member and melts it, somewhat as a slender column around the beam, through the plate, and melts the vane at the interface between the components. Such molten material readily cools as the beam is moved along; and the solidified material, at such interface, provides a solid welded joint. The beam is moved along in registry with the underlying vane, and at an appropriate speed, to assure that the interface along the vane is being completely melted, to provide that the welded joint 38 between each vane 20 is continuous and is virtually free of any interstices.

The fixture 40, being of a material having good thermal conductivity and fitting close to such vane and plate components, provides an effective heat sink, particularly from the face portions of the plate and vanes directly against the fixture surfaces. The fixture 40 moreover fits close to the exterior surface of the plate and vanes at all locations, even close to the juncture between the clamped components, but not at the interface between the components. This serves to prevent the molten material from extruding from the interface, between the clamped components, during the molten condition of the interface. The net result is a sound and continuous, and an unusually "clean" welded joint, having little if any flashing build-up adjacent the base of the vane 20 at the plate 22.

In moving the beam axially along the vane member, it may also be desirable to simultaneously move the beam transverse to the length of the clamped vane member, or in a zigzag manner, to span the width of the vane member needed in order to provide proper heating of the interface between the vane member and plate.

While the beam is being focused at the inner end of any of the vane members, the shield 78 diverts the beam to preclude unwanted heating of the underlying portions of the plate and fitting.

Once the welded joints 38 between the bottom wall plate and vane members have all been made, the clamping ring 44 may be removed from the fixture block 42 and the knock-out screws 64 may be tightened down against the plate 22 to drive the plate, and the vanes 20 now secured thereto, to define the bottom wall assembly 14 from the fixture. This may be needed because of the close tolerances between the fixture and the individual plate and vane components, in the first place; and because these components must now be removed simultaneously as part of the one-piece rigid bottom wall assembly 14. Generally, the plug 56 can remain in the fixture block 42 during the separation of the assembly from the fixture.

By way of example, the plate 22 may be of a thickness of the order of 0.25 of an inch (6.35 millimeters), and each vane member may be of a thickness of the order of 0.06 of an inch (1.6 millimeters). The maximum thickness of the plate may be of the order of perhaps 0.5-0.7 of an inch (12-18 millimeters). The vane member may be of any length, but the illustrated bottom wall assembly may have a vane length of the order of 0.84 of an inch (2.1 millimeters). Clearance tolerances may be only several thousandths of an inch, such as between perhaps 0.002-0.010 of an inch (0.05-0.25 of a millimeter).

The vane members have been illustrated as being generally straight, to provide radial vanes; but they could also have a curved shape to define spirally shaped radial vanes. Also, the height of each vane is illustrated as being uniform; but the free edge 77 of the vane may be angled somewhat relative to the opposite edge that is to be welded to the plate face 76, to provide varying vane heights along the length of the vane. In this regard, the edge of the vane member that initially is clamped against plate face 76 is of course shaped to correspond to the shape of the plate face itself, to provide a tightly-clamped and close tolerance interface between these components before welding them together.

In the container illustrated, the upper end of the opening 26 is conical, and the inner ends of the vanes 14 overlie the opening and are cantilevered somewhat beyond the support with the plate 22. This combination greatly improves centrifugal separation of the separating fractions of the liquids passing through the container, and the flow of the liquid from the outlet passageway 16. Moreover, such is easily made with the disclosed fixture and beam welding technique, as contrasted to an assembly that is to be machined from a single piece.

As noted, the exposed welded juncture between the vane and the plate may be so free of flashing build-up, that no post-welding machining need be made to this region; and in fact, may even be suspected of being a unitary one-piece assembly. The opposite side 74 of the plate may be somewhat distorted, with "beam tracks", caused by the beam passing along and over the surface. However, they generally are in the form of slight protrusions that may be easily ground or otherwise machined off to leave a flat surface.

In the fabrication of the container 10, the respective joints 24 and 32 may generally be made by conventional heli-arc welding techniques. In welding the joint 32, such may be done from the upper side of the plate 22, or the inside of the container; but before the plate 22 has been secured to the side wall 12, and also before the vanes 20 have been secured to the plate 22. Welding of the joint 24 can be done from the outside of the container 10; after the joint 32 has been welded, and also after the vanes 20 have been secured to the plate 22 according to the manner just described. The joints 24 and 32, formed by heli-arc welding, will be sufficiently void of flashing build-up and/or interstices in the welded joint, to be acceptable for the intended applications.

In the container construction illustrated, all of the surfaces of the container 10, including the bottom wall assembly, that will be exposed to the corrosive fluid passing through the container, may be painted with a chemically-resistant epoxy paint or gel coating.

Figure 3:
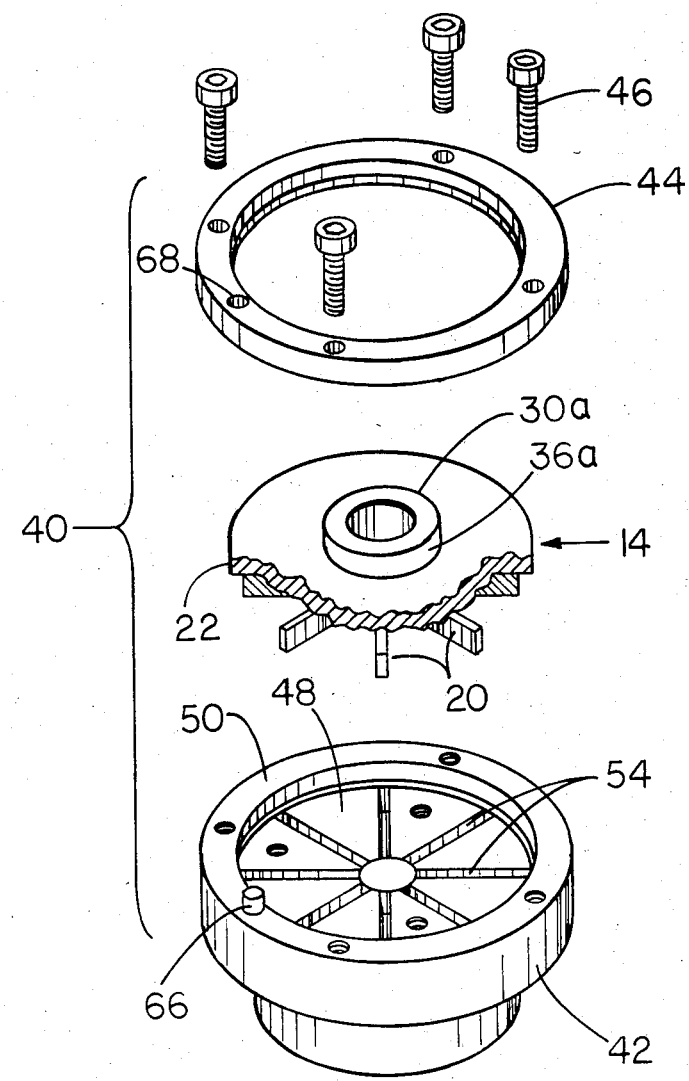
FIG. 3 is a broken-away perspective view of the component assembly used in the container of FIGS. 1 and 2, except showing it in an inverted position relative to its orientation in FIG. 2, and showing the same component assembly spaced between and in an exploded relation to apparatus disclosed herein to form the component assembly.

The fitting 30a illustrated in FIG. 3 may be different from that illustrated in the other figures, in that it has a uniform exterior surface 36a, and does not have any threads. The fitting may be connected to an appropriate conduit or the like by soldering or brazing such in place.

We claim:

1. A method of welding an elongated metallic piece to one side of a metallic plate from the opposite other side of such plate, such method comprising the steps of
   temporarily clamping the elongated piece to such one side of the plate while leaving the opposite side of the plate exposed,
   the clamped piece and plate initially having an interface tracing an elongated path therebetween with interstices along the plate,
   providing a heat conductive heat sink material, and configuring such material to engage such piece, and such plate on the one side, each at locations proximate to but spaced from the interface,
   subjecting the other side of such plate to an electron welding beam, focused narrowly at and in registry opposite to the elongated clamped piece,
   moving the electron welding beam along the elongated path in opposite registry to the elongated clamped piece,
   the electron welding beam being supplied with adequate energy for penetrating through the plate, across the interface, and into the piece,
   whereby the electron welding beam produces molten material from the plate and piece at the interface,
   the heat sink material sufficiently cooling the plate and piece proximate to but not at the interface, and preventing thereby the molten material from extruding from the interface, but instead of filling the interstices and providing a welded joint substantially void of interstices.

2. A method of welding, according to the steps of claim 1, further comprising the additional steps of
   providing several metallic pieces to be welded to one side of a metallic plate from the opposite other side of such plate,
   temporarily clamping each of the pieces to such one side of the plate while leaving the opposite side of the plate exposed, and
   successively subjecting the other side of such plate to an electron welding beam, focused narrowly at and in registry opposite to each of the respective clamped pieces.

3. A method of welding, according to the steps of claim 1, further comprising the additional steps of
   providing an electrically conductive heat resistant shield, and
   locating the shield on the other side of such plate between the source of the beam and the plate, operable to interfere with the direct bombardment of, and thus reduce the heating effect of, the electron welding beam on certain protected regions of the other side of such plate.

4. A method of welding, according to the steps of claim 1, further comprising the additional step of providing the clearance tolerances between the heat sink material and the engaged portions of the plate and piece are of the order of only several thousandths of an inch, between 0.002–0.010 of an inch (0.05–0.25 of a millimeter).

5. Apparatus for use in welding a metallic piece to one side of a metallic plate, by directing an electron welding beam against the opposite side of the plate, such apparatus comprising a heat sink body made of a heat conductive material, such body having a surface for engaging such one side of the plate, such body also having a recess therein, from the surface, for receiving and contacting the piece, first clamping means for clamping the plate against the heat sink body, with such one side of the plate engaging such surface of the heat sink body, second clamping means connected with the heat sink body for clamping the piece, while still in the recess, against the one side of the plate, across an interface therebetween, the first clamping means affording an opening exposing much of the other side of the plate, whereby such other side can be directly subjected to the electron welding beam in opposite registry with the underlying clamped piece, the electron welding beam being focused for penetrating through the plate and into the piece to produce molten material from each at the interface, which upon cooling solidifies and forms a welded joint thereat, the heat sink body affording a heat sink for cooling the plate and piece proximate to but not at the interface, and preventing thereby the molten material from extruding beyond the interface.

6. Apparatus for use in welding, according to claim 5, further comprising close clearance tolerances between such body recess and the piece received therein, of the order of only several thousandths of an inch, between 0.002–0.010 of an inch (0.05–0.25 of a millimeter).

7. Apparatus for use in welding, according to claim 5, further wherein the heat sink body recess is elongated in the form of a slot, wherein the piece is elongated to fit within the slot, and wherein the elongated piece, while still in the recess, is clamped against the one side of the plate, across a correspondingly elongated interface therebetween.

8. Apparatus for use in welding, according to claim 7, further wherein the second clamping means include set screw means threaded into tap means in the heat sink body, the set screws being driven against the piece as received in the slot.

9. Apparatus for use in welding, according to claim 5, further wherein the first clamping means include a member adapted to overlie the other side of the plate, and bolt means threaded into taps in the heat sink body to draw the member tightly against the other side of the plate.

10. Apparatus for use in welding, according to claim 5, further comprising the heat sink body being formed of copper.

11. Apparatus for use in welding, according to claim 5, further comprising a shield, and means to support the shield to be interposed between the source of the electron beam and portions of the one side of the plate, such shield being of an electrically conductive material having good thermal resistance, operable to prevent direct bombardment of the beam against such portions of the one side of the plate.

12. Apparatus for use in welding a plurality of thin elongated metallic pieces to one side of a metallic generally planar plate having a transverse edge, by directing an electron welding beam against the opposite side of the plate, such apparatus comprising a heat sink body made of a heat conductive material, such body having a cup shape, including a generally planar surface and an annular rim upstanding from the surface and configured to correspond with the transverse edge of the plate, such body also having a through opening inwardly spaced from the rim, and a plug adapted to be temporarily press-fitted in the through bore, such body also having a plurality of slots in the surface, corresponding in number to the number of pieces, the slots extending radially from the opening, the pieces being adapted to be received in the slots, one in each, the tolerance clearance between the pieces and the slots being close providing a sliding fit, means for clamping the plate against the body, with such one side of the plate engaging such surface of the heat sink body, a plurality of set screws threaded in taps in the heat sink body, one of each opening to one of the respective slots generally mid-way between the rim and the opening of the plate, each set screw being operable to be driven against a respective one piece in the slot, for clamping each piece against the one side of the plate, across an elongated interface therebetween, the first clamping means affording exposure of the other side of the plate opposite to each of the underlying clamped pieces, whereby such other side can be directly subjected to the electron welding beam, focused in opposite registry successively, with each of the underlying clamped pieces, the electron welding beam being of intensity sufficient for penetrating through the plate and into each of the pieces to produce molten material from each at the respective interface, which upon cooling solidifies and forms a welded joint thereat, the heat sink body affording a heat sink for cooling the plate and each of the pieces proximate to but not at each of the respective interfaces, and preventing thereby the molten material from extruding beyond the interfaces.

13. Apparatus for use in welding, according to claim 12, further comprising a shield, and means to support the shield to be interposed between the source of the electron beam and portions of the one side of the plate next to and at the plate opening, such shield being of an electrically conductive material having good thermal resistance, operable to prevent direct bombardment of the beam against such portions of the one side of the plate.

14. Apparatus for use in welding, according to claim 12, further comprising such close clearance tolerances between such body slots and the respective pieces received therein being of the order of only several thousandths of an inch, between 0.002–0.010 of an inch (0.05–0.25 of a millimeter).

15. Apparatus for use in welding, according to claim 12, further comprising the heat sink body being formed of copper.

* * * * *